(12) United States Patent
Xiong et al.

(10) Patent No.: US 10,663,034 B2
(45) Date of Patent: May 26, 2020

(54) BRUSHLESS SERVO

(71) Applicant: UBTECH Robotics Corp, Shenzhen (CN)

(72) Inventors: Youjun Xiong, Shenzhen (CN); Yong Fu, Shenzhen (CN); Hongyu Ding, Shenzhen (CN)

(73) Assignee: UBTECH ROBOTICS CORP., Shenzhen (CN)

( * ) Notice: Subject to any disclaimer, the term of this patent is extended or adjusted under 35 U.S.C. 154(b) by 267 days.

(21) Appl. No.: 15/851,719

(22) Filed: Dec. 21, 2017

(65) Prior Publication Data

US 2019/0097496 A1   Mar. 28, 2019

(30) Foreign Application Priority Data

Sep. 28, 2017 (CN) .......................... 2017 1 0905903

(51) Int. Cl.
| | |
|---|---|
| *F16H 1/20* | (2006.01) |
| *F16H 1/06* | (2006.01) |
| *H02K 7/116* | (2006.01) |
| *H02K 11/215* | (2016.01) |
| *H02K 11/30* | (2016.01) |
| *H02K 11/33* | (2016.01) |
| *F16H 57/02* | (2012.01) |

(52) U.S. Cl.
CPC ............... *F16H 1/06* (2013.01); *F16H 1/20* (2013.01); *F16H 1/206* (2013.01); *F16H 57/02* (2013.01); *H02K 7/116* (2013.01); *H02K 11/215* (2016.01); *H02K 11/30* (2016.01); *H02K 11/33* (2016.01)

(58) Field of Classification Search
CPC ... F16H 1/20; F16H 1/206; F16H 1/06; F16H 57/02; F16H 57/023; H02K 7/116
See application file for complete search history.

(56) References Cited

U.S. PATENT DOCUMENTS

| | | | | |
|---|---|---|---|---|
| 4,165,658 A | * | 8/1979 | Ueno ........................ | F16H 1/20 251/248 |
| 5,038,629 A | * | 8/1991 | Takimoto .................. | F16H 1/20 74/421 A |
| 6,857,338 B2 | * | 2/2005 | Tsergas ................. | F16H 57/028 74/421 A |
| 2009/0039725 A1 | * | 2/2009 | Kanatani ................ | H02K 1/187 310/195 |
| 2014/0182406 A1 | * | 7/2014 | Chen ..................... | F16H 57/021 74/421 R |

(Continued)

FOREIGN PATENT DOCUMENTS

| | | | |
|---|---|---|---|
| CN | 102324803 A | * | 1/2012 |
| EP | 3203111 A1 | * | 8/2017 |

*Primary Examiner* — Luis A Gonzalez

(57) ABSTRACT

A brushless servo includes a housing, a motor, a printed circuit board (PCB), a servo output shaft and a gear transmission mechanism that are accommodated within the housing. The motor includes a motor output shaft that is arranged in parallel with the servo output shaft. The gear transmission mechanism includes a number of gearsets that connect the motor output shaft to the servo output shaft. Each gearset has a gear and a pinion that is smaller than the gear, and each of a first one of the gearsets and a last one of the gearsets is arranged in a manner that the gear is below the pinion thereof. Each of the rest of the gearsets is arranged in a manner that the gear is above the pinion thereof.

18 Claims, 5 Drawing Sheets

(56) References Cited

U.S. PATENT DOCUMENTS

2018/0147923 A1\* 5/2018 Liu .......................... B60J 7/085
2018/0219435 A1\* 8/2018 Billet ....................... H02K 1/14
2018/0347682 A1\* 12/2018 Masuzawa ............ F16H 57/021
2019/0252944 A1\* 8/2019 Watrin ...................... F16H 1/06

\* cited by examiner

BRUSHLESS SERVO

CROSS REFERENCE TO RELATED APPLICATIONS

This application claims priority to Chinese Patent Application No. 201710905903.8, filed Sep. 28, 2017, which is hereby incorporated by reference herein as if set forth in its entirety.

BACKGROUND

1. Technical Field

The present disclosure generally relates to servos, and particularly to a brushless servo.

2. Description of Related Art

Typically, servos include brushed servos and brushless servos. The difference between them is that brushed servos use brushed motors, while brushless servos use brushless motors. A brushed motor includes a rotor including a commutator and rotor windings and a stator including stator core and brushes. Brushed motors are a mature technology, but have some drawbacks. For example, brushes tend to be worn and need to be replaced periodically, much heat is generated, and the thermal efficiency is not high. Compared with the brushed motors, brushless motors have a longer life and higher thermal efficiency.

Many conventional brushless servos have limited output power because of their limited size, thereby limiting the scope of application of the brushless servos.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
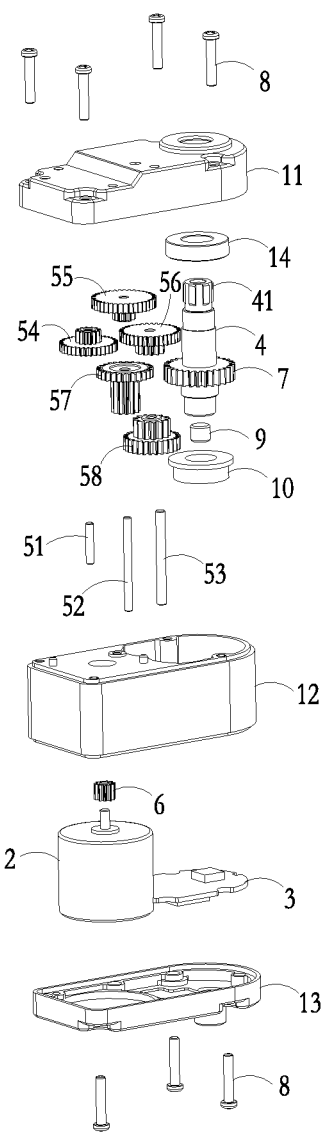
FIG. 1 is an isometric exploded view of a brushless servo according to one embodiment.

The disclosure is illustrated by way of example and not by way of limitation in the figures of the accompanying drawings, in which like reference numerals indicate similar dements. It should be noted that references to "an" or "one" embodiment in this disclosure are not necessarily to the same embodiment, and such references can mean "at least one" embodiment.

In the description, relative terms such as "horizontal," "vertical," "up," "down," "top" and "bottom" as well as derivatives should be construed to refer to the orientation as then described or as shown in the drawing under discussion.

Figure 2:
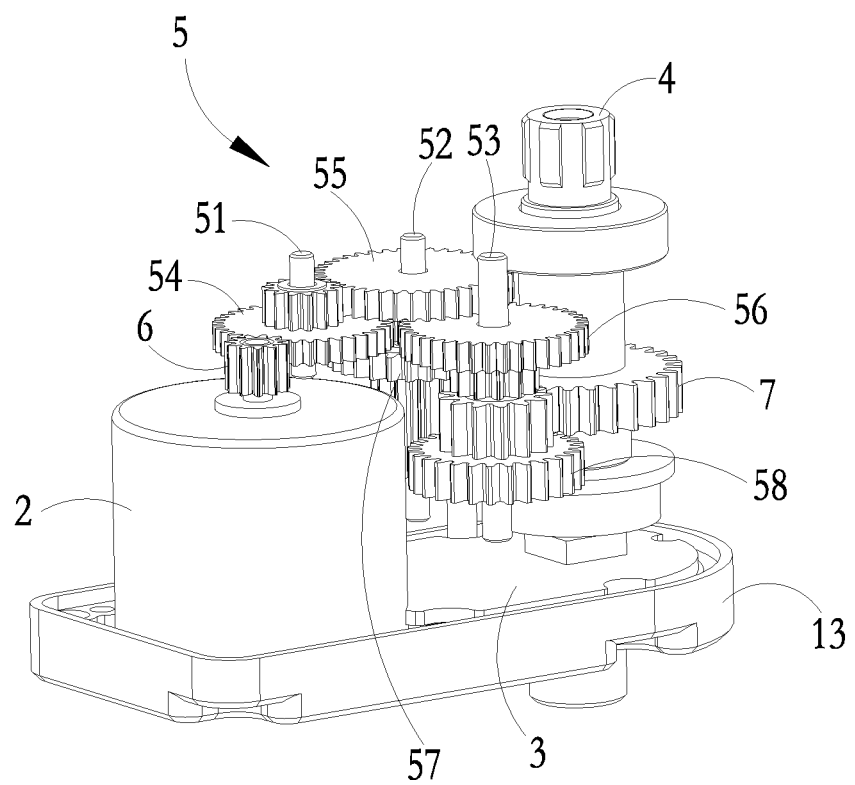
FIG. 2 is an isometric view of the brushless servo of FIG. 1, with some components omitted for clarity.
Figure 3:
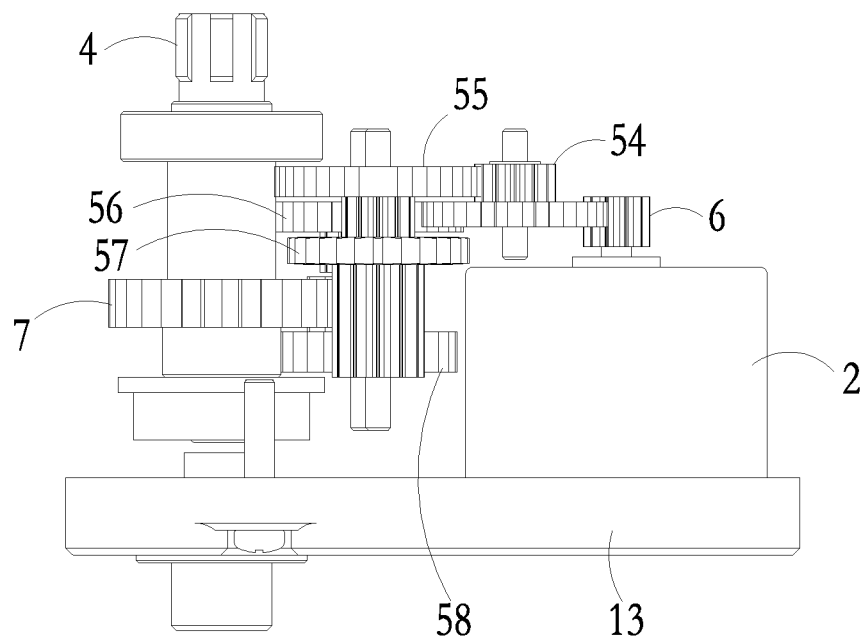
FIG. 3 is a front view of the brushless servo of FIG 3.

Referring to FIGS. 1-3, in one embodiment, a brushless servo includes a housing 1, a motor 2, a printed circuit board (PCB) 3, a servo output shaft 4 and a gear transmission mechanism 5 that are accommodated within the housing 1. The motor 2 is electrically connected to the PCB 3 and can receive an instruction from the PCB 3. As shown in FIG 3, the servo output shall 4 is vertical and located above the PCB 3. The motor 2 includes a motor output shaft that is arranged in parallel with the servo output shaft 4. The gear transmission mechanism 5 is arranged between the motor output shaft and the servo output shaft and used to increase the transmission ratio of the brushless servo. Specifically, the gear transmission mechanism 5 includes a number of gearsets that connect the motor output shaft to the servo output shaft 4. Each gearset includes a gear and a pinion that is smaller than the gear. Each of the first one of the gearsets and the last one of the gearsets is arranged in a first manner that the gear is below the pinion thereof, and each of the rest of the gearsets is arranged in a second manner that the gear is above the pinion thereof.

The motor output shaft of the motor 2 is disposed in parallel with the servo output shaft 4, and the gear transmission mechanism 5 is connected between the motor output shaft and the servo output shaft 4 so that the brushless servo can have larger transmission ratio, thereby increasing the transmission efficiency. The first gearset and the last gearset each are arranged in a manner that the gear is below the pinion thereof, and each of the rest gearsets is arranged in a manner that the gear is above the pinion, which requires less internal space, thereby allowing the brushless servo to have a compact structure.

In one embodiment, a motor gear 6 is arranged around the motor output shaft and a servo gear 7 is arranged around the servo output shaft 4. The motor gear 6 is engaged with the first one of the gearsets of the gear transmission mechanism 5, and the servo gear 7 is engaged with the last one of the gearsets. The power outputted by the motor 2 can then he transmitted to the servo output shaft 4 through the gear transmission mechanism 5. It not only improves the transmission ratio of the brushless servo, but also saves the internal space of the brushless servo to make the structure of the brushless servo more compact by using the multiple gears that are engaged with one another.

In one embodiment, a distance between the motor gear 6 and a bottom of the housing 1 is greater than a distance between the servo gear 7 and the bottom of the housing 1, which allows the gear transmission mechanism 5 to be located between the motor 2 and the servo output shaft 4, thereby saving the internal space of the brushless servo to make the structure of the brushless servo more compact.

In one embodiment, the gear transmission mechanism 5 further includes a number of shafts that are parallel to the servo output, shaft 4. A number of gearsets are successively meshed with one another, that is, each gearset is meshed with an adjacent gearset. The gearsets are respectively meshed with the motor gear 6 and the servo gear 7. The gear and the pinion of each gearset are coaxial. The gear is fixedly connected to the pinion. The diameter of the gear is larger than that of the pinion. Each gear serves as an input gear of the gear set, and each pinion serves as the output gear of the gear set, that is, the gear of each gearset meshes with the pinion of the previous gearset and the pinion of each gearset meshes with the gear of the next gearset. The gear of the first gearset meshes with the motor gear 6, and the pinion of the last gearset meshes with the servo gear 7. The number of the gearsets can vary according to actual needs. For example, the number of the gearsets can be determined according to the transmission ratio required by the brushless servo. A brushless servo including five gearsets will be described as an example.

Specifically, the gear transmission mechanism 5 includes a first shaft 51, a second shaft 52, a third shaft 53, a first gearset 54, a second gearset 55, a third gearset 56, a fourth gearset 57 and a fifth gearset 58. The motor output shaft of the motor 2 drives the servo gear 7 to rotate by the engagements of the first gearset 54 through the fifth gearset 58, thereby driving the servo output shaft 4 to rotate. The first shaft 51, the second shaft 52 and the third shaft 53 are parallel to one another and are all parallel to the servo output shaft 4 and the motor output shaft of the motor 2. The first gearset 54 is arranged around the first shaft 51. The second gearset 55 and the fourth gearset 57 are arranged around the second shaft 52. The third gearset 56 and the fifth gearset 58 are arranged around the third shaft 53. The first gearset 54, the second gearset 55, the third gearset 56, the fourth gearset 57, and the fifth gearset 58 are sequentially meshed with one another. The first gearset 54, the second gearset 55, the third gearset 56, the fourth gearset 57, and the fifth gearset 58 each include a gear and a pinion. The gear of the first gear set 54 meshes with the motor gear 6, which constitutes a first stage reduction mechanism. The pinion of the first gearset 54 meshes with the gear of the second gearset 55, which constitutes a second stage reduction mechanism. The pinion of the second gearset 55 meshes with the gear of the third gearset 56, which constitutes a third stage reduction mechanism. The pinion of the third gearset 56 meshes with the gear of the fourth gearset 57, which constitutes a fourth stage reduction mechanism. T he pinion of the fourth gearset 57 meshes with the gear of the fifth gearset 58, which constitutes a fifth stage reduction mechanism. The pinion of the fifth gearset 58 meshes with the servo gear 7, which constitutes a sixth stage reduction mechanism.

In one embodiment, the pinions of the first gearset 54 and the fifth gearset 58 are both arranged above the gears thereof. The pinions of the second gearset 55, the third gearset 56 and the fourth gearset 57 are arranged under the gears thereof. With such configuration, it allows the transmission of power among the first gearset 54, the second gearset 55, the third gearset 56, the fourth gearset 57 and the fifth gearset 58 through the sequential engagements thereof. Further, it can save the internal space of the brushless servo, making the structure of the brushless servo more compact.

In one embodiment, the pinions of the third gearset 56 and the fifth gearset 58 that are arranged around the third shaft 53 contact each other. With such configuration, it can save the internal space of the brushless servo, making the structure of the brushless servo more compact.

In one embodiment, the gear and the pinion of each of the first gearset 54, the second gearset 55, the third gearset 56, the fourth gearset 57 and the fifth gearset 58 are integrally formed to save cost and make the assembling of these components easy.

Figure 4:
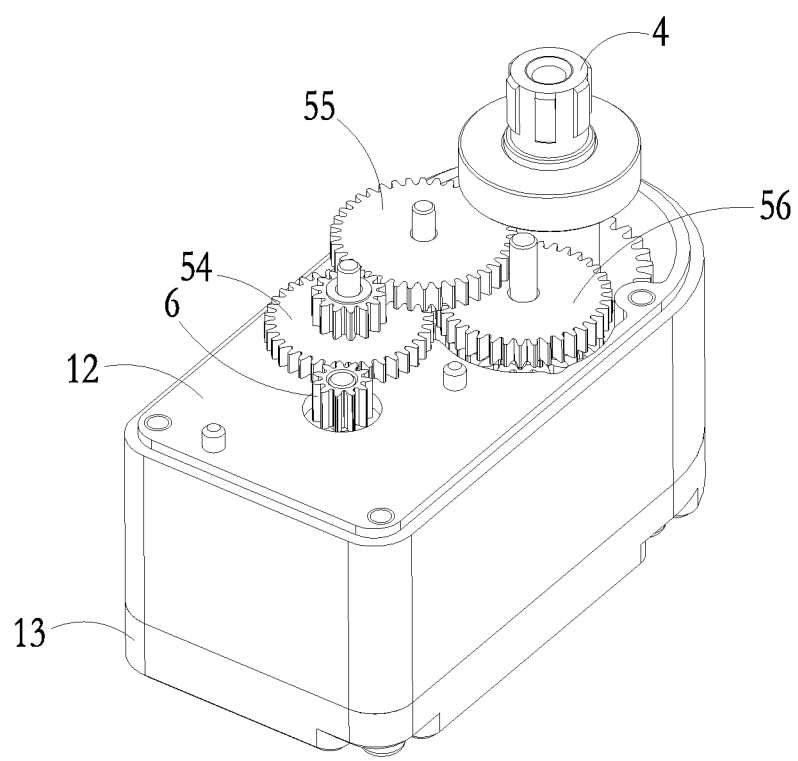
FIG. 4 is another isometric view of the brushless servo of FIG. 1, with some components omitted for clarity
Figure 5:
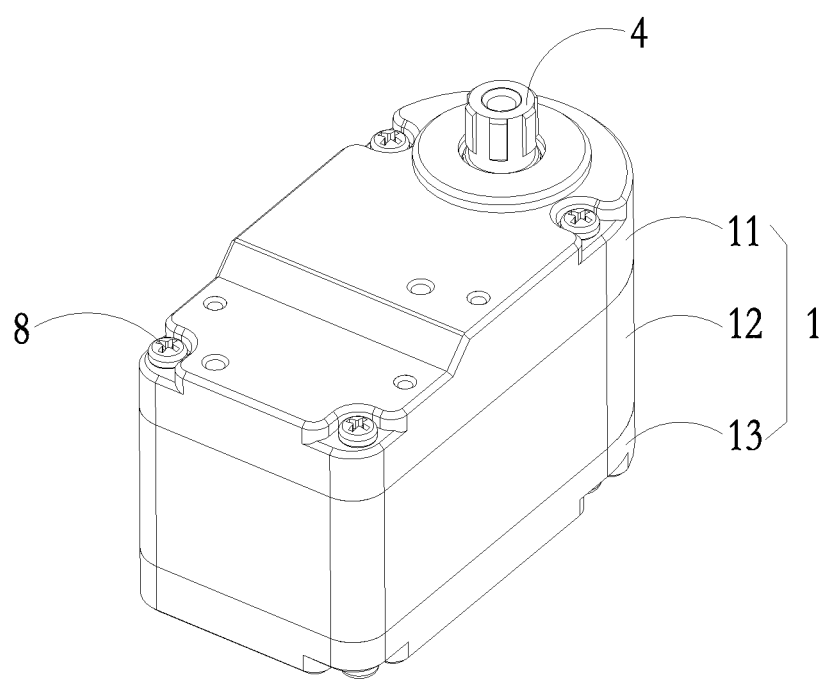
FIG. 5 is an isometric view of the brushless servo of FIG. 1.

Referring to FIGS. 4 and 5, in one embodiment, the housing 1 includes an upper housing 11, a middle housing 12 and a lower housing 13 that are stacked in sequence. An end of the motor output shaft extends from the middle housing 12 into the upper housing 11, and an end of the servo output shaft 4 is exposed out from the upper housing so that it can be connected with other components. The upper housing 11 and the middle housing 12 are fixedly connected to each other by screws 8, and the middle cover 12 and the lower housing 13 are also fixedly connected to each other by screws 8. The servo output shaft 4 further includes an external spline 41 at an end thereof and the external spline passes through a through hole of the upper housing 11 and is extends out of the upper housing 11 so that it can be connected with other components. A flange bearing 10 is arranged around the outside of the lower end of the servo output shaft 4 that is away from the external spline 41 and a bearing 14 is arrange around the servo output shaft 4 at a position adjacent to the external spline 41. A blind hole (not shown) is defined in the lower end of the servo output shaft 4 away from the external spline 41. A magnet 9 is lightly fit within the blind hole. The flange bearing 10 and the magnet 9 are spaced apart from the PCB 3. The magnet 9 opposes the magnetic encoder on the PCB 3.

The working principle of the brushless servo is as follows: The motor 2 drives the motor gear 6 to rotate, and motor gear 6 then sequentially drives the first gearset 54, the second gearset 55, the third gearset 56, the fourth gearset 57 and the fifth gearset 58 to rotate. The fifth gearset 58 drives the servo output gear 7 to rotate, thereby driving the servo output shaft 4 to rotate. The power is transmitted from the motor 2 to the servo output shaft 4, through the first stage reduction mechanism, the second stage reduction mechanism, the third stage reduction mechanism, the fourth stage reduction mechanism, the fifth stage reduction mechanism and the sixth stage reduction mechanism, which saves the internal space of the brushless servo and improves the transmission ratio of the brushless servo.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:
1. A brushless servo comprising:
   a motor comprising a motor output shaft and a motor gear arranged around the motor output shaft;
   a printed circuit board (PCB);
   a servo output shaft arranged in parallel with the motor output shaft and comprising a servo gear arranged around the servo output shaft;
   a gear transmission mechanism comprising a plurality of gearsets that engage in sequence and connect the motor output shaft to the servo output shaft, each gearset comprising a gear and a pinion smaller than the gear, each of the first one of the gearsets and the last one of the gearsets being arranged in a first manner that the gear is below the pinion thereof, and each of the rest of the gearsets being arranged in a second manner that the gear is above the pinion thereof, the first one of the gearsets being engaged with the motor gear, the last one of gearsets being engaged with the servo gear; and
   a housing in which the motor, the printed circuit board (PCB), the servo output shaft, the gear transmission mechanism are accommodated, the housing comprising an upper housing, a middle housing and a lower housing that are stacked in sequence, wherein the motor output shaft extends from the middle housing into the upper housing to connect to the motor gear that is received within the upper housing, the servo output shaft connects to the servo gear received within the middle housing and extends out of the upper housing.
2. The brushless servo of claim 1, wherein a distance between the motor gear and a bottom of the housing is greater than a distance between the servo gear and the bottom of the housing.

3. The brushless servo of claim 1, wherein the gear transmission mechanism further comprises a plurality of shafts that are parallel to the servo output shaft, and the gearsets are arranged around the shafts.

4. The brushless servo of claim 3, wherein the gear and pinion of each of the gearsets are coaxial and fixed to each other, the gear of each of the gearsets serves as an input gear, and the pinion of each of the gearsets serves as an output gear.

5. The brushless servo of claim 4, wherein the gear transmission mechanism comprises a first shaft, a second shaft, a third shaft that are parallel to one another, a first gearset arranged around the first shaft, a second gearset and a fourth gearset that are arranged around the second shaft, and a third gearset and a fifth gearset that are arranged around the third shaft, the first gearset is engaged with the second gearset that is engaged with the third gearset, and the third gearset is engaged with the fourth gearset that is engaged with the fifth gearset.

6. The brushless servo of claim 5, wherein the pinions of the third gearset and the fifth gearset contact each other.

7. The brushless servo of claim 4, wherein the gear and the pinion of each of the gearsets are integrally formed.

8. The brushless servo of claim 5, wherein the first gearset, the second gearset, the third gearset and the fourth gearset are received within the upper housing, the fifth gearset is received within the middle housing.

9. The brushless servo of claim 1, wherein the servo output shaft further comprises an external spline at an end thereof, and the external spline extends out of the housing.

10. The brushless servo of claim 1, wherein the first one of the gearsets is received within the upper housing, the last one of gearsets is received within the middle housing.

11. A brushless servo comprising:
a housing comprising an upper housing, a middle housing and a lower housing that are stacked in sequence, the upper housing and the middle housing forming a first accommodating space, and the middle housing and the lower housing forming a second accommodating space;
a motor received in the second accommodating space with a motor output shaft extending through the middle housing and sleeved with a motor gear that is received in the first accommodating space;
a printed circuit board (PCB) received in the second accommodating space;
a servo output shaft arranged in parallel with the motor output shaft and having a first end extending to the first accommodating space and sleeved with a flange bearing and a second end extending to the second accommodating space and sleeved with another flange bearing and a servo gear; and
a gear transmission mechanism comprising a plurality of gearsets that engage in sequence, each gearset comprising a gear and a pinion smaller than the gear, each of the first one of the gearsets and the last one of the gearsets being arranged in a first manner that the gear is below the pinion thereof, and each of the rest of the gearsets being arranged in a second manner that the gear is above the pinion thereof, the first one of the gearsets being received in the first accommodating space and engaged with the motor gear, the last one of gearsets being received in the second accommodating space and engaged with the servo gear.

12. The brushless servo of claim 11, wherein the gear transmission mechanism further comprises a plurality of shafts that are parallel to the servo output shaft, and the gearsets are arranged around the shafts.

13. The brushless servo of claim 12, wherein the gear and pinion of each of the gearsets are coaxial and fixed to each other, the gear of each of the gearsets serves as an input gear, and the pinion of each of the gearsets serves as an output gear.

14. The brushless servo of claim 13, wherein the gear transmission mechanism comprises a first shaft, a second shaft, a third shaft that are parallel to one another, a first gearset arranged around the first shaft, a second gearset and a fourth gearset that are arranged around the second shaft, and a third gearset and a fifth gearset that are arranged around the third shaft, the first gearset is engaged with the motor gear and the second gearset, the second gear is engaged with the third gearset that is engaged with the fourth gearset, the fourth gearset is engaged with the fifth gearset that is engaged with the servo gear.

15. The brushless servo of claim 14, wherein the pinions of the third gearset and the fifth gearset contact each other.

16. The brushless servo of claim 14, wherein the first gearset, the second gearset, the third gearset and the fourth gearset are received in the first accommodating space, the fifth gearset is received in the second accommodating space.

17. The brushless servo of claim 13, wherein the gear and the pinion of each of the gearsets are integrally formed.

18. The brushless servo of claim 11, wherein the first end of the servo output shaft extends out of the first accommodating space through the upper housing to be connected to an external spline.

* * * * *